(12) United States Patent
Shrivastava et al.

(10) Patent No.: US 8,020,034 B1
(45) Date of Patent: Sep. 13, 2011

(54) DEPENDENCY FILTER OBJECT

(75) Inventors: Sunita Shrivastava, Redmond, WA (US); Chittur Subbaraman, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 10/880,939

(22) Filed: Jun. 30, 2004

Related U.S. Application Data (60) Provisional application No. 60/560,716, filed on Mar. 12, 2004.

(51) Int. Cl.
*G06F 11/00* (2006.01)

(52) U.S. Cl. ........................... 714/4.11; 709/226

(58) Field of Classification Search ............... 714/4, 4.1, 714/4.11
See application file for complete search history.

(56) References Cited

U.S. PATENT DOCUMENTS

| | | | |
|---|---|---|---|
| 6,038,677 A * | 3/2000 | Lawlor et al. | 714/4 |
| 6,154,849 A * | 11/2000 | Xia | 714/4 |
| 6,163,855 A | 12/2000 | Shrivastava et al. | |
| 6,178,529 B1 * | 1/2001 | Short et al. | 714/51 |
| 6,360,331 B2 | 3/2002 | Vert et al. | |
| 6,449,734 B1 | 9/2002 | Shrivastava et al. | |
| 6,973,473 B1 * | 12/2005 | Novaes et al. | 709/201 |
| 7,065,565 B2 * | 6/2006 | Dini | 709/222 |
| 7,143,167 B2 * | 11/2006 | Kampe et al. | 709/226 |
| 7,191,358 B2 * | 3/2007 | Fujibayashi | 714/6 |
| 2002/0120744 A1 * | 8/2002 | Chellis et al. | 709/226 |
| 2005/0071449 A1 * | 3/2005 | Alex et al. | 709/223 |
| 2005/0071470 A1 * | 3/2005 | O'Brien et al. | 709/226 |

* cited by examiner

*Primary Examiner* — Yolanda L Wilson
(74) *Attorney, Agent, or Firm* — Lee & Hayes, PLLC (57) ABSTRACT

A dependency filter object for use in a server cluster is described. In an implementation, a method includes bringing online one or more resource objects included in a dependency tree. Each of the resource objects corresponds to a resource available in a server cluster. The dependency tree includes a dependency filter object that specifies a dependency of a first one of the resource objects on a second one of the resource objects. The bringing online of the first resource object is managed according to the specified dependency on the second resource object.

22 Claims, 8 Drawing Sheets

DEPENDENCY FILTER OBJECT

RELATED APPLICATIONS

The present application claims priority under 35 U.S.C. §119(e) to U.S. Provisional Patent Application No. 60/560,716, filed Mar. 12, 2004, and titled "Dependency Filter Object", the disclosure of which is hereby incorporated by reference in its entirety.

TECHNICAL FIELD

The present invention generally relates to server clusters, and more particularly relates to a dependency filter object for use in a server cluster.

BACKGROUND

A server cluster is a group of independent servers connected by a network and managed as a single system. The clustering of the servers provides a number of benefits over independent servers. One such benefit is that cluster software, which is run on the servers in a cluster, may be configured to automatically detect application failures or the failure of another server in the cluster. Upon detection of such failures, failed applications may be restarted on a surviving server without a substantial reduction in service. The server cluster may also be configured such that clients of the server cluster view the cluster as a single physical system, even though the system may include services provided by one or more of several servers. A client, for instance, may create a TCP/IP session with a service in the cluster using a known IP address. This address appears to the cluster software as a resource in the same group (i.e., a collection of resources managed as a single unit) as the application providing the service. In the event of a failure, the cluster "moves" the entire group to another system.

Other benefits include the ability for administrators to inspect the status of cluster resources, and accordingly balance workloads among different servers in the cluster to improve performance. Such manageability also provides administrators with the ability to update one server in a cluster without taking important data and applications offline. As can be appreciated, server clusters are useful in providing high availability for critical database management, file and intranet data sharing, messaging, general business applications, and the like.

A cluster works with a number of basic system components, known as "resources", which provide some service to clients in a client/server environment or to other components within the system. Resources may correspond to physical devices, such as disks, to purely software constructs, such as processes, databases, and IP addresses. A resource may be implemented as a resource DLL and hosted by a resource monitor host process running in a cluster node. The resource DLL for a resource is responsible for the control and health monitoring of the underlying component. For instance, a resource DLL for a disk resource contains code which will bring the disk online, offline and monitor its health.

An application is typically represented as a collection of resource groups in the cluster. A resource group in a cluster is a containment unit for resources and is the basic unit of failover. A group could contain one or more directed acyclic graphs of resources where the directed links define dependencies between resources. A dependency between two resources defines an order in which those resources are brought online and offline. For example, a Structured Query Language (SQL) database resource can specify a dependency on a disk resource and a network name resource. The network name will be used by clients to connect to the SQL service. These dependencies allow the cluster runtime to instantiate and shutdown the various resource objects that form an application in a well-defined manner. Thus, in the above example when the group contains the three resources is taken offline, the dependent SQL resource is first taken offline followed by the provider disk resource and provider network name resource, the latter two in no particular order. In addition to defining a start and stop order for resources, the dependency of resources also defines the order in which resources are "terminated". Terminate refers to a notification delivered to a resource DLL in response to a failure event, when such a notification is delivered the resource that receives that notification typically takes the underlying application offline. Thus, in the above example, if the disk fails, the SQL resource is terminated first followed by the disk resource. The terminate processing may also be identical to the offline order of those resources. In this model, however, the failure of a provider resource always causes the termination of a dependent resource. Therefore, dependent resources are not currently provided with a choice of not getting a terminate notification or of specifying a redundant dependency on multiple provider resources. Continuing with the SQL example, there is no support for the SQL resource to express a dependency on two disk resources (e.g., D1 and D2) such that SQL resource can come online if one or both of the disks are online.

Accordingly, there is a continuing need to improve server cluster dependency between resource objects.

SUMMARY

A dependency filter object for use in a server cluster is described. An application is typically represented as a collection of resource groups in the cluster, where directed links define dependencies across the resource objects. Dependency filter objects are a mechanism to describe combined effects of dependencies on the resource objects. For example, the dependency filter object may be consulted during runtime to determine which actions are to be performed on a dependent resource when a state, e.g. online, offline, and so forth, changes for one or more provider resource objects of that particular resource object. For example, a network name resource may depend on multiple IP addresses resources "IP1" and "IP2", respectively. A dependency filter object may be utilized to specify dependencies such that the network name resource may tolerate the failure of one of the IP address resources, may be brought on line if either of the IP addresses are online, and so on. Thus, the dependency filter object may be utilized to provide flexibility in how dependent and provider resources are brought online, taken offline, maintained, and so on.

In an implementation, a method includes bringing online one or more resource objects included in a dependency tree. Each of the resource objects corresponds to a resource available in a server cluster. The dependency tree includes a dependency filter object that specifies a dependency of a first one of the resource objects on a second one of the resource objects. The bringing online of the first resource object is managed according to the specified dependency on the second resource object through the dependency filter object.

In an additional implementation, a system includes a plurality of resource objects and a dependency filter object. Each of the resource objects corresponds to a resource on a server in a server cluster. The dependency filter object specifies a dependency in execution, on the server, of a first one of the resource objects with respect to a second one of the resource objects.

In another implementation, a system includes a plurality of resource objects and a dependency filter object. Each of the plurality of resource objects corresponds to a resource in a server cluster. The dependency filter object is callable by a first one of the resource objects to determine whether to fail the first resource object when a second one of the resource object fails.

In a further implementation, a system includes a plurality of resource objects, a dependency filter object, and a cluster service. Each of the plurality of resource objects corresponds to a resource in a server cluster. The cluster service is for managing execution of the plurality of resource objects. The dependency filter object is callable by the cluster service to determine whether to bring a dependent one of the resource objects offline before a provider one of the resource objects is brought offline and whether to bring the dependent resource object online after the provider resource object is brought online.

BRIEF DESCRIPTION OF THE DRAWINGS

The same numbers are used throughout the disclosure and figures to reference like components and features.

DETAILED DESCRIPTION

Overview

A dependency filter object for use in a server cluster is described. An application in a server cluster may be represented as a directed acyclic graph of resource objects, where the directed links define dependencies between the resource objects. For example, one resource object may be dependent on another resource object, the first object is referred as the "dependent" resource object and the second one is referred to as a "provider" resource object. A dependency between resource objects defines the order in which the resource objects are brought online and offline. In addition, the dependency may also define how dependent resource objects are handled in the case of failure of a provider resource object. Thus, dependency filter objects are a mechanism to describe the combined effects of dependencies on a resource object. The server cluster, during runtime, may consult the dependency filter object to determine which actions are to be performed on a dependent resource when a state changes for one or more provider resource objects for that particular resource object.

The dependency filter object may be utilized to provide a variety of functionality. In a first example, the dependency filter object provides fault tolerance to an application via redundancy. The dependency filter object, for instance, can be used to describe a resource object "X" as depending on either one of redundant resource objects "Y1" and "Y2". Therefore, resource object "X" is brought online after either resource object "Y1" or "Y2" has been brought online, and resource object "X" is brought offline if both "Y1" and "Y2" are taken offline (e.g., if both resources objects fail), and so on. Therefore, the dependency filter object may be utilized to describe this dependency such that resource object "X" is able to take advantage of the redundancy provided by resource objects "Y1" and "Y2". A variety of other dependencies may also be described through use of the dependency filter object, examples of which may be found in the following discussion starting in relation to FIG. 3.

Exemplary Environment

Figure 1:
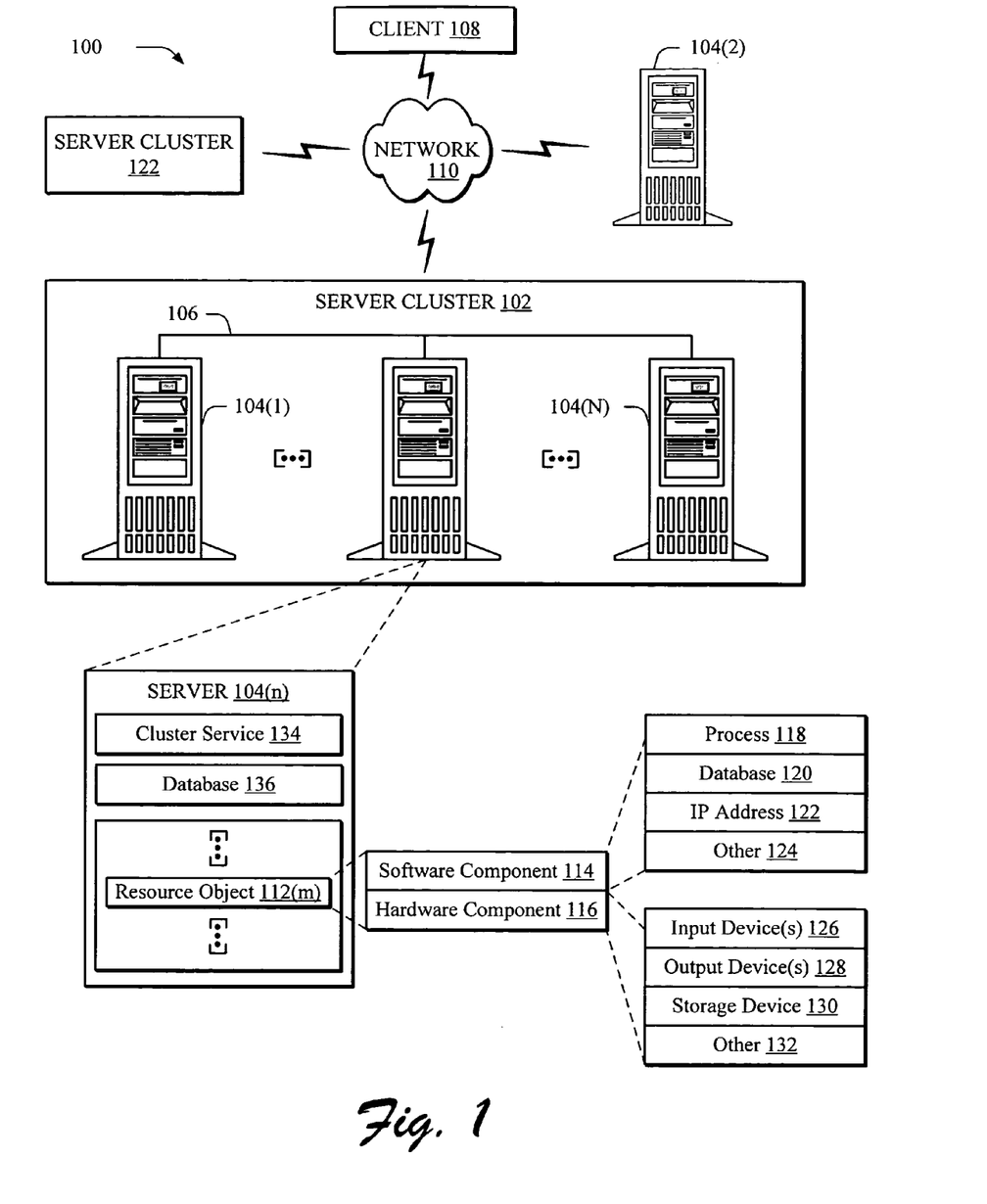
FIG. 1 is an illustration of an environment in an exemplary implementation showing a server cluster having a plurality of servers.

FIG. 1 is an illustration of an environment 100 in an exemplary implementation showing a server cluster 102 (cluster). The cluster 102 includes a plurality of servers 104(1), ..., 104(n), ..., 104(N), where "n" can be any integer between 1 and "N". The plurality of servers 104(1)-104(N) may be connected utilizing a network 106 and managed as a single system. For example, the network 106 may be configured as a local area network (LAN). The clustering of the plurality of servers 104(1)-104(N) may be utilized to provide a variety of benefits. For example, cluster software, which is run on each of the plurality of servers 104(1)-104(N) in the cluster 102, may be configured to automatically detect application failures and/or the failure of another one of the plurality of servers 104(1)-104(N) in the cluster 102. Upon detection of the failures, failed applications and the like can be restarted on one or more of the plurality of servers 104(1)-104(N) that did not fail such that the cluster 102 prevents a substantial reduction in service.

The cluster 102 may be configured such that a client connecting to the cluster 102 "believes" that the cluster 102 is a single physical system, but in actuality the client is connecting to a service which may be provided by one of several systems, e.g. the plurality of server 104(1)-104(N). For example, the client 108 may communicate with the cluster 102 over a network 110. The network 110 may be the same as or different from network 106. Network 110, for instance, may be configured as a wide area network (WAN) and network 106 may be configured as a LAN, both network 106 and network 110 may be configured as the Internet, and so on. Other networks that may be utilized for connecting the plurality of servers 104(1)-104(N) to form the cluster 102 include direct connections (e.g., serial and parallel connections) as well as wireless connections. In one usage scenario, the client 108 communicates with the cluster via a public network 110, e.g. a wide area network, while intracluster traffic is on a "private" network. Thus, the public network could spread in a wide area while the private network is provided by on the same subnet. Although the cluster 102 illustrates connection of the plurality of servers 104(1)-104(N) over a single network 106, one or more of the plurality of servers 104(1)-104(N) may be remotely connected part of the cluster 102. For example, server 104(2) is illustrated as communicatively coupled to the cluster 102 over network 110.

The client 108 may initiate a TCP/IP session with a service in the cluster 102 by using a known IP address. This address appears to the cluster software as a resource in the same group (i.e., a collection of resources managed as a single unit) as the application providing the service. In the event of a failure, the cluster service may "move" the entire group to another system.

The cluster 102 may also provide the ability for administrators to inspect the status of cluster resources, and accordingly balance workloads among different servers in the cluster to improve performance. Such manageability also provides administrators with the ability to update one of the plurality of servers 104(1)-104(N) in the cluster 102 without taking data and applications offline. Thus, the cluster 102 may be utilized in situations in which data availability and persistency is desired, such as database management, file and intranet data sharing, messaging, general business applications and the like.

The cluster 102 includes a plurality of resource objects 112($m$), where "m" can be any integer from one to "M", each of which are configured to provide one or more services to the client 108 (e.g., in a client/server arrangement) and/or to other components within the system. Each resource object 112($m$) may be utilized to reference a software and/or hardware component 114, 116. The software component 114, for instance, may be configured as a process 118, a database 120, an IP address 122, and other 124 software components. The hardware component 116 may be configured as a physical device, such as an input device 126, an output device 128, a storage device 130 (e.g., a hard disk drive), and other 132 hardware components. Although the software and hardware components 114, 116 are illustrated separately, the software and hardware components 114, 116 may be combined. Thus, a wide variety of disparate resource objects may be utilized by the cluster 102.

A system administrator may create the cluster 102 through execution of a cluster service 134 on one of the plurality of servers 104(1)-104(N). For a new cluster, a database 136 is created and the initial cluster member information (containing one node) is added thereto. The administrator then configures any devices that are to be managed by the cluster software. At this time, a cluster exists having a single member, after which an installation procedure is run on each of the other members of the cluster 102, i.e. servers 104(1), 104(N).

Figure 2:
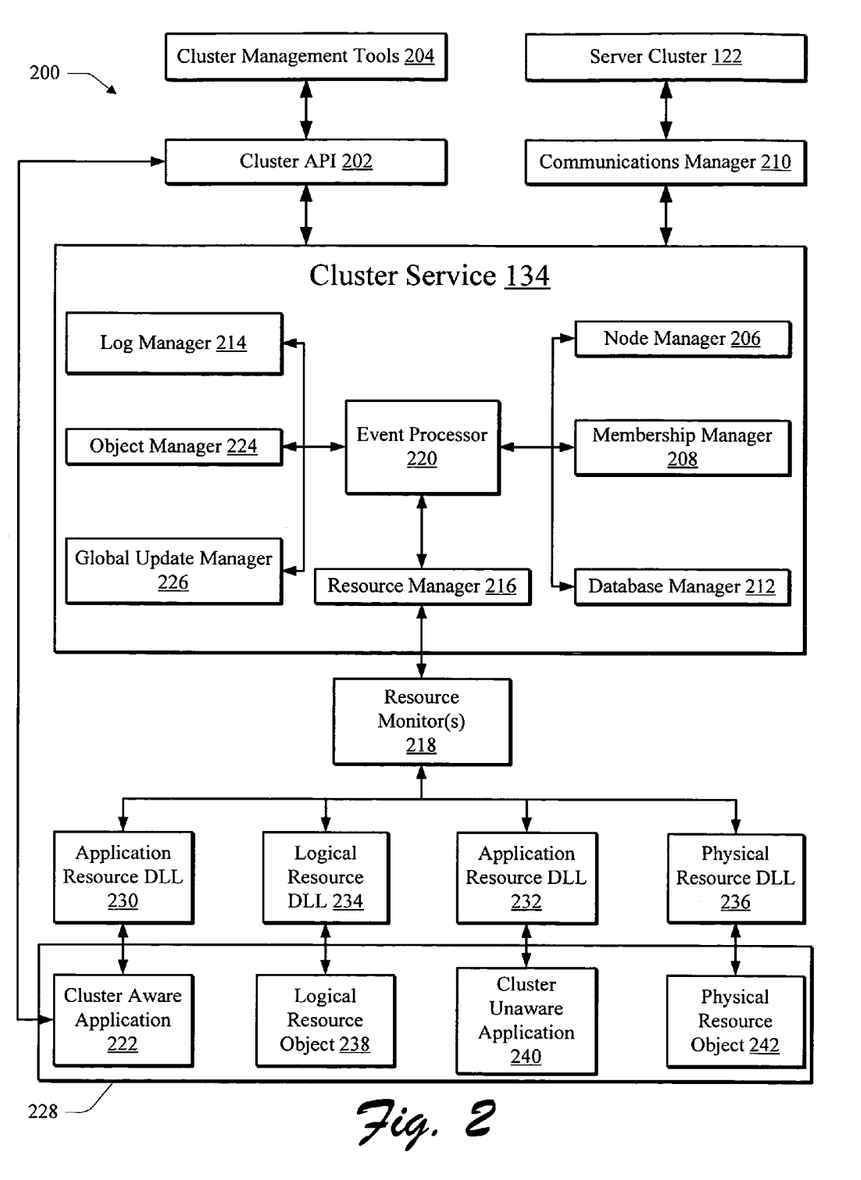
FIG. 2 is an illustration of an exemplary implementation of a system showing a cluster service of FIG. 1 depicted in greater detail.

FIG. 2 is an illustration of an exemplary implementation showing a system 200 which includes the cluster service 134 of FIG. 1 depicted in greater detail. The system 200 includes a cluster Application Programming Interface 202 (cluster API) to perform other administration of cluster resources, systems, and the cluster itself. Applications and cluster management administration tools 204 are executed to call various interfaces in the cluster API 202 using remote procedure calls (RPC), whether running in the cluster 102 or part of an external system, e.g. server 104(2) of FIG. 1. The various interfaces of the cluster API 202 may be considered as being categorized by respective associations with a particular cluster component, groups, resources, resource types, nodes, networks and network interfaces, such as systems, resources and the cluster itself. Resources are initially added to a cluster through use of the cluster management administration tools 204.

In FIG. 2, the cluster service 134 components and corresponding general relationships are represented pictorially in a single system (e.g., server 104($n$) of FIG. 1) of the cluster 102 of FIG. 1. The cluster service 134 controls operation of the cluster on the system. The cluster service 134 includes a node manager 206 that manages node configuration information and network configuration information (e.g., the paths between nodes). The node manager 206 operates in conjunction with a membership manager 208, which executes protocols that determine cluster membership when a change in membership of the cluster occurs, such as when a node is added, removed, and so on. A communications manager 210, also referred to as a kernel driver, manages communications with all other systems, e.g. servers 104(1), 104(N) of FIG. 1, of the cluster via one or more network paths. The communications manager 210 may send periodic messages, commonly referred to as heartbeats, to other communications managers executed on the other systems of the cluster to provide a mechanism for verifying that the communications path(s) are operating correctly and that the other systems are operational. Through the communications manager 210, the cluster service 134 may be in constant communication with the other systems of the cluster. In a small cluster, for instance, communications may be fully connected, i.e., all systems of the cluster are in direct communication with all other systems. As previously described, in one implementation each of the servers may be communicatively coupled in the same subnet.

The cluster service 134 also includes a configuration database manager 212 (database manager) which implements the functions that maintain a cluster configuration database on a local device (e.g., a disk and/or memory) and may also include the configuration database 134 of FIG. 1 on one or more common persistent storage devices. The configuration database 134 of FIG. 1 may maintain information about the physical and logical entities in the cluster, including the cluster itself, nodes, resource types, network configuration, groups, and resources. The database manager 212 may cooperate with counterpart database managers of other nodes in the cluster to maintain configuration information consistently across the cluster. Global updates are used to ensure the consistency of the cluster database in all systems. The database manager 212 also provides an interface to the configuration database 134 of FIG. 1 for use by the other cluster service components. A log manager 214 provides a facility that works with the database manager 212 to maintain cluster state information across a situation in which a cluster shuts down and a new cluster is later formed with no members common to the previous cluster, which may be referred to as a temporal partition.

Figure 4:
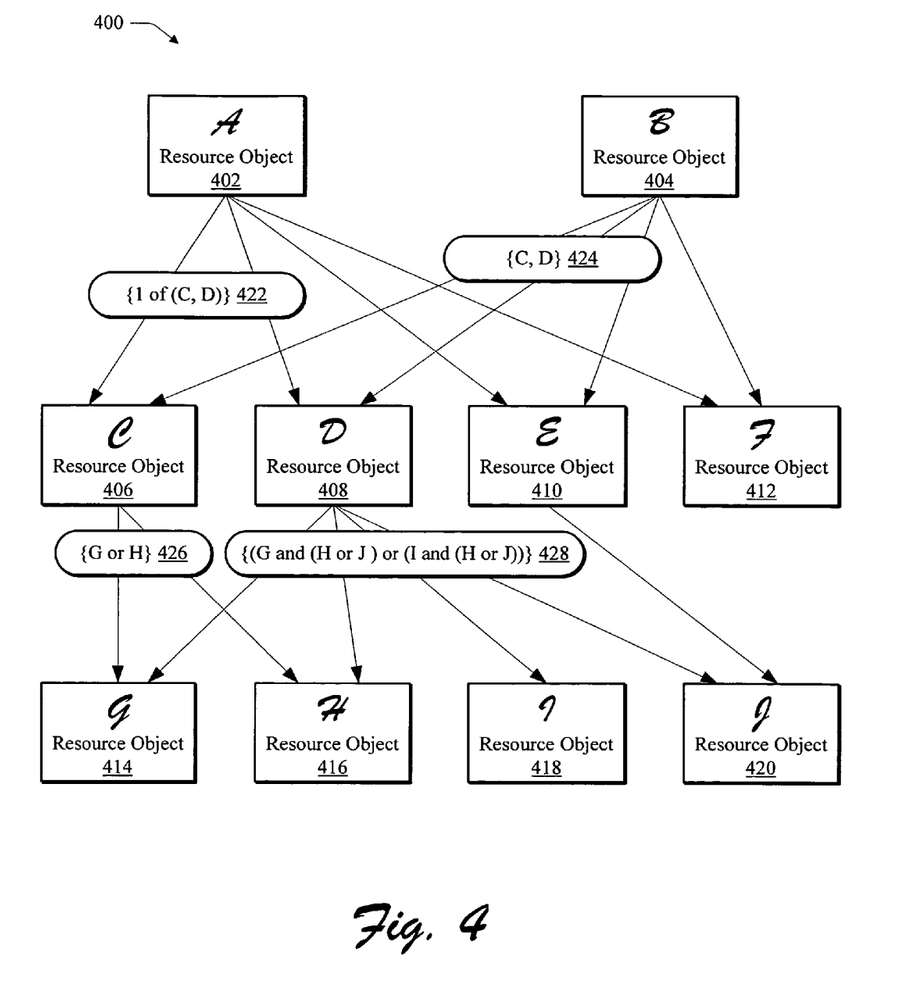
FIG. 4 is an illustration of a dependency tree having a plurality of resource objects and a plurality of dependency filter objects.

A resource control manager 216 (hereinafter referred to as the "resource manager"), when executed, makes resource/group management decisions and initiate appropriate actions to those decisions, such as startup, restart and failover. The resource manager 216 is responsible for stopping and starting the system's resources, managing resource dependencies, and for initiating failover of groups. A group could contain one or more directed acyclic graphs of resources where the directed links define dependencies between resources. A dependency between two resources defines an order in which those resources are brought online, offline, are maintained when online, and so on. For example, a group may include a resource that depends on a network name, which in turn depends on an Internet Protocol (IP) address, all of which are collected in a single group, as example of which is shown in FIG. 4. In an embodiment, dependencies of the resources in the group are maintained in a directed acyclic graph, known as a dependency tree, which is also described in greater detail in relation to FIG. 4. In an implementation, group operations performed on a group may affect all resources contained within that group.

The resource manager 216 receives resource and system state information from at least one resource monitor 218 and the node manager 206 to make decisions about groups. In one implementation, for instance, the resource manager 216 is responsible for deciding which systems in the cluster should "own" which groups. Those systems that own individual groups, for instance, turn control of the resources within the group over to respective resource managers 216.

An event processor 220 connects the components of the cluster service 134 and handles event notification operations. The event processor 220, for instance, may propagate events to applications and both to and from the components within the cluster service 134. The event processor 220 also performs miscellaneous services, such as delivering signal events to cluster-aware applications 222. The event processor 220, in conjunction with an object manager 224, further maintains various cluster objects. A global update manager 226 operates to provide a global update service that is used by other components within the cluster service 134.

Systems in the cluster maintain a consistent view of time. One of the systems, referred to as the time source, includes a resource that provides the time service. In an implementation, the time service, which maintains consistent time within the cluster, is implemented as a resource rather than as part of the cluster service 134, itself. In another implementation, an underlying service provides the time service functionality.

From the point of view of systems in the cluster (e.g. servers 104(1)-104(N) of FIG. 1), systems in the cluster may be in one of a variety of distinct states, such as offline, online, paused, joining, and so on. These states may be visible to other systems in the cluster, and thus may be considered the state of the cluster service 134. When offline, a system is not a fully active member of the cluster. When online, a system is a fully active member of the cluster, and can honor cluster database updates, maintain heartbeats, can own and run groups, and so on.

A paused system is a fully active member of the cluster, and thus may honor a cluster database update and may maintain heartbeats. Thus, online and paused may be treated as equivalent states by portions of the cluster software. A system that is in the paused state, however, does not honor requests to take ownership of groups. The paused state is provided to allow maintenance of the system to be performed.

After initialization is complete, the external state of the system is offline. To join a cluster, following the restart of a system, the cluster service 134 is started automatically when the cluster service is configured by default with an autostart service. The system configures and mounts local, non-shared devices. Cluster-wide devices are left offline while booting, because the devices may be in use by another node. In an implementation, the system may attempt to communicate over the network with last known members of the cluster. When the system discovers any member of the cluster, it performs an authentication sequence in which the existing cluster system authenticates a "newcomer" and returns a status of success if authenticated, or fails the request if not. For example, if a system is not recognized as a member or the system's credentials are invalid, then the request to join the cluster is refused. If successful, the database in the arriving system is examined, and if it is out of date, it is sent an updated copy. The joining system may use this shared database to find shared resources, bring the shared resources online as needed, and to find other cluster members. If a cluster is not found during the discovery process, the system may attempt to form its own cluster.

When leaving a cluster, a cluster member will send a "cluster exit" message to all other members in the cluster, which is used to notify the other members of the cluster member's intent to leave the cluster. In an implementation, the exiting cluster member does not wait for responses from the other members and therefore immediately proceeds to shutdown all resources and close all connections managed by the cluster software. Sending a message to the other systems in the cluster when leaving saves the other systems from discovering the absence by a time-out operation.

Once online, a system can have groups thereon. In an implementation, a group may be "owned" by only one system at a time, and the individual resources within a group are present on the system which currently owns the group. As a result, at any given instant, different resources within the same group are not owned by different systems across the cluster. Groups can be failed over or moved from one system to another as atomic units. Each group has a cluster-wide policy associated therewith comprising an ordered list of owners. A group fails over to systems in a configured order.

When an entire system in the cluster fails, its groups are pulled from the failed system to another system. This process is similar to pushing a group, but without a shutdown phase on the failed system. In another implementation, the groups are pushed. To determine what groups were running on the failed system, the systems maintain group information on each node of the cluster in memory in the resource manager 216 to track which systems own which groups.

When a previously failed system returns to an online status, the resource manager 216 is executed to decide whether to move a portion of the groups back to that system, in an action referred to as failback. To automatically failback, groups specify a preferred owner. Groups specifying the newly online system as the more preferred owner than the node in which the group is currently hosted are pushed from the current owner to the new system. Protection, in the form of a timing window, is included to control when failback occurs.

Resource objects 228 are managed by the cluster software, and are generally available to one system in the cluster at any instance in time, although the resource objects 228 can be brought online on any system in the cluster. In an implementation, any one of the resource objects 228 may depend on other resource objects, however, circular dependencies are not allowed. This forms a directed acyclic graph, known as a dependency tree, which is further described in relation to FIG. 3.

If one of the resource objects 228 depend on another resource object, that resource object is brought online after the other resource (or resources) on which it depends are already online, and is taken offline before the other resource. Moreover, each resource object 228 has an associated list of systems in the cluster 102 of FIG. 1 on which that particular resource object may execute. For example, a disk resource may be hosted on systems that are physically connected to the disk device. Also associated with each resource object is a local restart policy, defining the desired action in the event that the resource cannot continue on the current system.

The resource objects 228 may have a common set of states and methods that may be applied to any resource in order to generally control the resource and to detect failures or initiate failure recovery thereof. In this manner, the cluster software components are able to treat disparate resource objects such as physical devices and application programs identically. The controlling software treats the resource objects 228 abstractly and is aware of well-defined states within which the resource object can exist to generally control the resource object and to handle failure recovery of the resource object at an abstract level. To monitor the resource objects 228, the resource monitor 218 executes in one or more processes that are separate from the cluster service 134 and communicate therewith via Remote Procedure Calls (RPC). The resource monitor 218 controls and monitors the health of one or more resource objects 228 via callbacks thereto. For example, if a resource, e.g. cluster aware application 232, fails the resource manager 216 may choose to restart the resource locally up to some predetermined number of times, and to take the resource offline along with one or more resources that are dependent thereon. If the resource manager 216 takes the resource offline (such as if local restart attempt fails too many consecutive times), the resource manager 216 indicates that the group including the resource should be restarted on another system in the cluster, which is known as pushing the group to another system. A cluster administrator may also manually initiate such a group transfer. In general, the resource manager 216 works to transition the resource objects 228 from an initial offline (unavailable) state to an online (available) state. States common to resources include offline, offline pending, online, online pending and failed.

Resource components may be implemented as Dynamically Linked Libraries (DLLs) loaded into the address space the resource monitor 218. For example, the resource component DLLs may include application resource DLLs 230, 232, a logical resource DLL 234, and a physical resource DLL 236, and other DLLs, such as file and print shares, network addresses and names, Internet Server service DLLs, and so on.

Each specific resource DLL is responsible for the actual creation, deletion and management of a respective one of the resource objects 228 (e.g., physical device, application, other software construct, and the like) that provides the service. For example application resource DLL 230 is responsible for cluster aware application 222. Likewise, logical resource DLL 234 is responsible for logical resource object 238, application resource DLL 232 is response for cluster unaware application 240, and physical resource DLL 236 is responsible for physical resource object 242.

Methods may be applied the resource objects 228 for control thereof, such as Open, (to create an instance of a specific resource), Close, (to destroy an instance of a specific resource), Online, (to bring the resource into a usable state), Offline, (to bring the resource into an unusable state) and Terminate, (a forced Offline method). A variety of other methods may be provided, including methods directed to property management and monitoring the health of the resources.

The controlling Methods (Open, Close, Online, Offline and Terminate) are used to create and control an instance of a specific resource. The Open and Close methods are used to create and destroy an instance of a given resource, respectively. The Offline method instructs the resource DLL to make the specific instance of a resource object unavailable for use on the local system. The Terminate method is similar to the Offline method, except that it is used when a clean shutdown of the resource might not be possible.

Dependency Trees

An application, as previously described, may be represented as resource groups in a cluster. A resource group in a cluster is one or more directed acyclic graphs of resources objects where the directed links define dependencies across resources. The resources in the graph are represented through the use of resource objects. The dependencies allow the cluster runtime to instantiate and terminate the various software components that form an application in a well-defined manner. Dependency filter objects provide a mechanism to describe the combined effects of dependencies of resource objects in a dependency tree. The resource manager consults the dependency filter objects to decide which action, if nay, should be taken regarding a dependent resource when the state of any provider resource for that particular resource changes.

Figure 3:
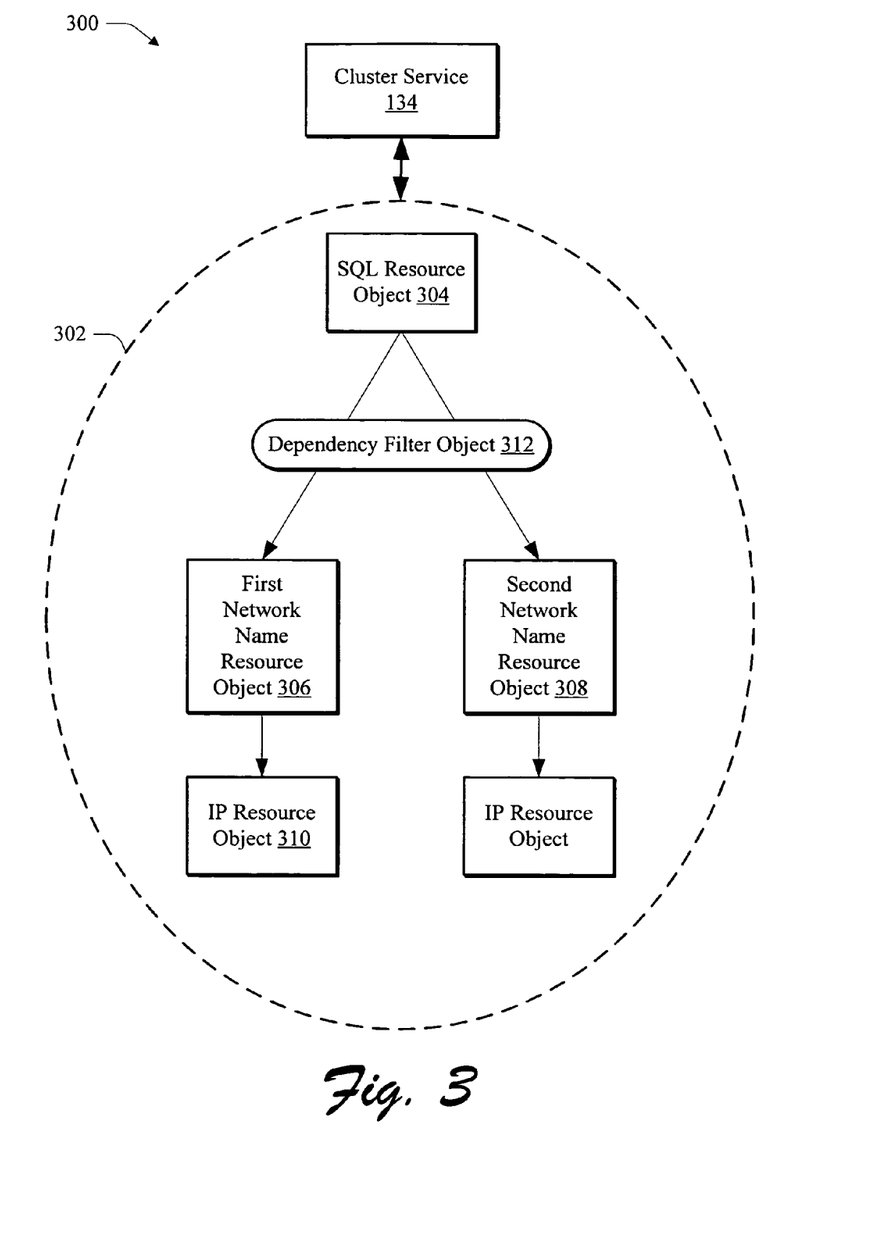
FIG. 3 is an illustration of a dependency tree of a resource group having a plurality of resource objects.

FIG. 3 is an illustration of a dependency tree 300 of a resource group 302 having a plurality of resource objects. A dependency between resource objects defines an order in which the resources are brought online or offline. For example, a Structured Query Language (SQL) resource may be represented by a SQL resource object 304 in the dependency tree 300. Likewise, a first network name resource, a second network name resource, and an IP address resource may be represented respectively as a first network name resource object 306, a second network name resource object 308, and an IP resource object 310.

As illustrated in FIG. 3, the SQL resource object 304 has a dependency, i.e. is dependent, on the first and second network name resource objects 306, 308. In this case, the corresponding first and second network names resources are provider resource objects and the SQL resource is a dependent resource object. The first network name resource object 306, in turn, has a dependency on an IP address resource object 310 and the second network name resource 308 ahs a dependency on IP address resource object 312. Therefore, if the user attempts to bring the SQL resource object 304 online from an offline state when the IP and first network name resource objects 310, 306 are offline and the second network name resource object 308 and IP address resource object 312 is online, the cluster service 134 (e.g., through execution of the resource manager 216) will first attempt to bring the IP address resource object 310 online, next the first network name resource object 306, and finally the SQL resource object 304.

The dependency tree 300 also includes a dependency filter object 314. The dependency filter object 314 causes the cluster service 134 to evaluate actions to be taken to bring online, bring offline, and/or terminate resource objects in the dependency tree 300. For example, a state transition of a provider resource, e.g. the second network name resource object 308, may cause the cluster service 134 to evaluate the actions it must take on dependent resource objects, e.g. the SQL resource object 304. The cluster service 134 decides upon the actions based upon the dependency filter object 314 configured for that particular set of dependencies. For example, the dependency filter object 314 may specify that the SQL resource object 304 is dependent on redundant resource objects, e.g. the first and second network name resource objects 306, 308. Therefore, the SQL resource object 304 is not terminated unless both the first and second network name resource objects 306, 308 fail. In this way, the dependency filter object 314 allows the cluster service 134 to control the behavior of the dependency tree 300 in a more flexible manner. By using the dependency filter object 314, a resource may depend on multiple redundant providers. The dependency filter object 314 also allows different resource objects to express dependency on the same resource object at different levels of redundancy. For example, a dependent resource object may be dependent on any two of a plurality of provider resource objects, while another dependent resource object may be dependent on any one of the plurality of provider resource objects.

A variety of behaviors may be described using the dependency filter object 314. In a first example, the dependency filter object 314 describes a permissible number of provider resources that should be available to bring online the dependent resource. The dependency filter object 314 may specify "M out of N and P out of N" provider resource objects, where "N" is the total number of provider resource objects, "M" is the number of provider resource objects that should be available to bring online the dependent resource, and "P" is the number of provider resources that are to remain available to prevent the dependent resource from being terminated. For instance, the dependency filter object 314 may specify that a dependent resource should be brought online (e.g., SQL resource 304) when "M" or more of the "N" provider resource objects (e.g., first and second network name resource objects 306, 308) affiliated with the dependency filter object 314 have been brought online, and stop the dependent resource (e.g., SQL resource 304) only if less than P of the provider resources affiliated through the dependency filter object 314 have failed or be brought offline.

In an additional example, the dependency filter object 314 expresses desired behaviors by using Boolean expressions. The dependency filter object 314, for instance, may utilize any regular Boolean Expression to express dependencies, such as "Resource A depends on ((Resource B && Resource C)||(Resource E && Resource F))".

In yet another example, the dependency filter object 314 specifies particular collections of resource object dependencies. For instance, the dependency filter object 314 may specify that "resource objects A+B+C out of 32 resource objects" are sufficient to bring the dependent resource object online. Although three examples of the specifying of dependencies have been discussed, a wide variety of other techniques may be utilized to describe desired behaviors, additional examples of which are illustrated in FIG. 4.

FIG. 4 is an illustration of a dependency tree 400 having a plurality of resource objects 402-420 and a plurality of dependency filter objects 422-428. As previously stated, dependency filter objects 422-428 may express dependencies in a variety of ways. Additionally, the dependency filter objects 422-428 may be "positioned" between different collections of resources objects to provide additional flexibility in the description of dependencies.

Dependency filter object 422, for example, is positioned between resource object 402 and resource objects 406, 408. Resource object 402 is dependent on resource objects 406, 408, i.e. the resource objects 406, 408 are provider resources to a resource corresponding to the resource object 402. Resource objects 402, 406, 408 are represented pictorially as including the letters "A", "C", and "D", respectively. The dependency filter object 422 describes the dependency of the resource object 402 on resource objects 406, 408. As illustrated, dependency filter object 422 specifies the resource object 402 is dependent on "1 of (C, D)". Therefore, resource object 402 will remain online as long as one of the resource object 406 or the resource object 408 is online. In order to bring resource object 402 online, only one of resource object 406 or resource object 408 needs to be brought online.

Dependency filter object 424 is illustrated as being positioned between resource object 404 and resource objects 406, 408, 410 which are represented pictorially as including letters "C", "D", and "E", respectively. Dependency filter object 424 specifies that resource object 404 is dependent on a collection of resource objects "C, D". Therefore, resource object 404 may be brought online and/or remain online if resource objects 406, 408 are online, regardless of whether resource object 410 is online. The arrow between resource object 404 and resource object 412 is representative of a directed link which indicates that resource object 404 is also dependent on resource object 412. Thus, a dependency filter object is not needed to describe each dependency in the dependency tree 400.

Dependency filter object 426 is illustrated as being positioned between resource object 406 and resource objects 414, 416 which are represented pictorially as including letters "G" and "H", respectively. Dependency filter object 426 specifies that resource object 404 is dependent on resource objects "G or H" by using a Boolean expression. Therefore, resource object 406 may be brought online and/or remain online if resource object 414 or resource object 416 is online. It should be noted that in this example, dependent filter object 426 acts in a manner similar to dependency filter object 422, even though the respective dependencies were specified utilizing different techniques.

Lastly, dependency filter object 428 is illustrated as being positioned between resource object 408 and resource objects 414, 416, 418, 420 which are represented pictorially as including letters "G", "H", "I", and "J", respectively. Dependency filter object 428 specifies that resource object 408 is dependent on resource objects 414-420 by using the Boolean expression "(G and (H or J) or (I and (H or J))". Therefore, resource object 408 may be brought online and/or remain online if resource objects 414 and 416 are online, if resource objects 414 and 420 are online, if resource objects 416 and 418 are online, and so on. For example, resource objects 414, 418 and resource objects 416, 420 may be redundant. The dependency filter object 428 may therefore express this redundancy such that different permissible combinations of the resource objects 414-420 may be online to bring the resource object 408 online or to keep it online. Although single dependency filter object associated with particular resources are illustrated, a plurality of dependency filter objects may also be utilized. For example, in such an instance, dependencies may be "anded" across the plurality of dependency filter objects that may be associated with a dependent resource. In another implementation, a single dependency filter object may provide support for a plurality of general regular expressions to describe dependencies.

Exemplary Procedures

A dependency filter object may be implemented as a programmable object that can expose one or more interfaces to provide a variety of functions. The dependency filter object, for instance, may expose interfaces to describe if the dependent resource objects should be brought online when bringing a particular provider resource object online and if the dependent resource should be terminated in response to failure of a provider resource object and should be brought offline if a particular provider resource object is brought offline. Exemplary functions are discussed below.

EvaluateUpstreamOnline

The dependency filter object may expose an "EvaluateUpstreamOnline" function for use in bringing resource objects online in compliance with the specified dependencies in the dependency tree. When a resource object corresponding to a particular resource transitions to an online state, the cluster service consults one or more dependency filter objects affiliated with that provider resource object to determine which "upstream" resource objects should also be brought online. Therefore, the cluster service may bring the provider resource objects "online" first before the dependent resource object is brought online. Additional discussion of bringing a resource object online may be found in relation to FIG. 5.

EvaluateIsAlive

The dependency filter object may also expose an "EvaluateIsAlive" function for determining whether an executing resource object should declare failure due to failure of a provider resource object. For example, a resource object may consult the dependency filter object related to the resource object it detects a failure in a given provider resource. By consulting the dependency filter object, the resource object may determine if it should fail by invoking the "EvaluateIsAlive" function affiliated with the dependency filter object. Additional discussion of bringing resource objects offline during execution in response to failure by another resource object may be found in relation to FIG. 6.

EvaluateUpstreamTerminate

The dependency filter object may also expose an "EvaluateUpstreamTerminate" function for use in determining whether to bring an executing resource object offline due to unavailability of another resource object. The cluster service, for instance, may consult each dependency filter object affiliated with a provider resource object when that resource object transitions to a failed state or is brought to an offline state by an administrator. The cluster service determines, through examination of the dependency filter object, which upstream resources should also be terminated by invoking the "EvaluateUpstreamTerminate" function affiliated with the dependency filter object. Additional discussion of terminating resource objects during execution in response to termination of another resource object may be found in relation to FIG. 7.

Figure 5:
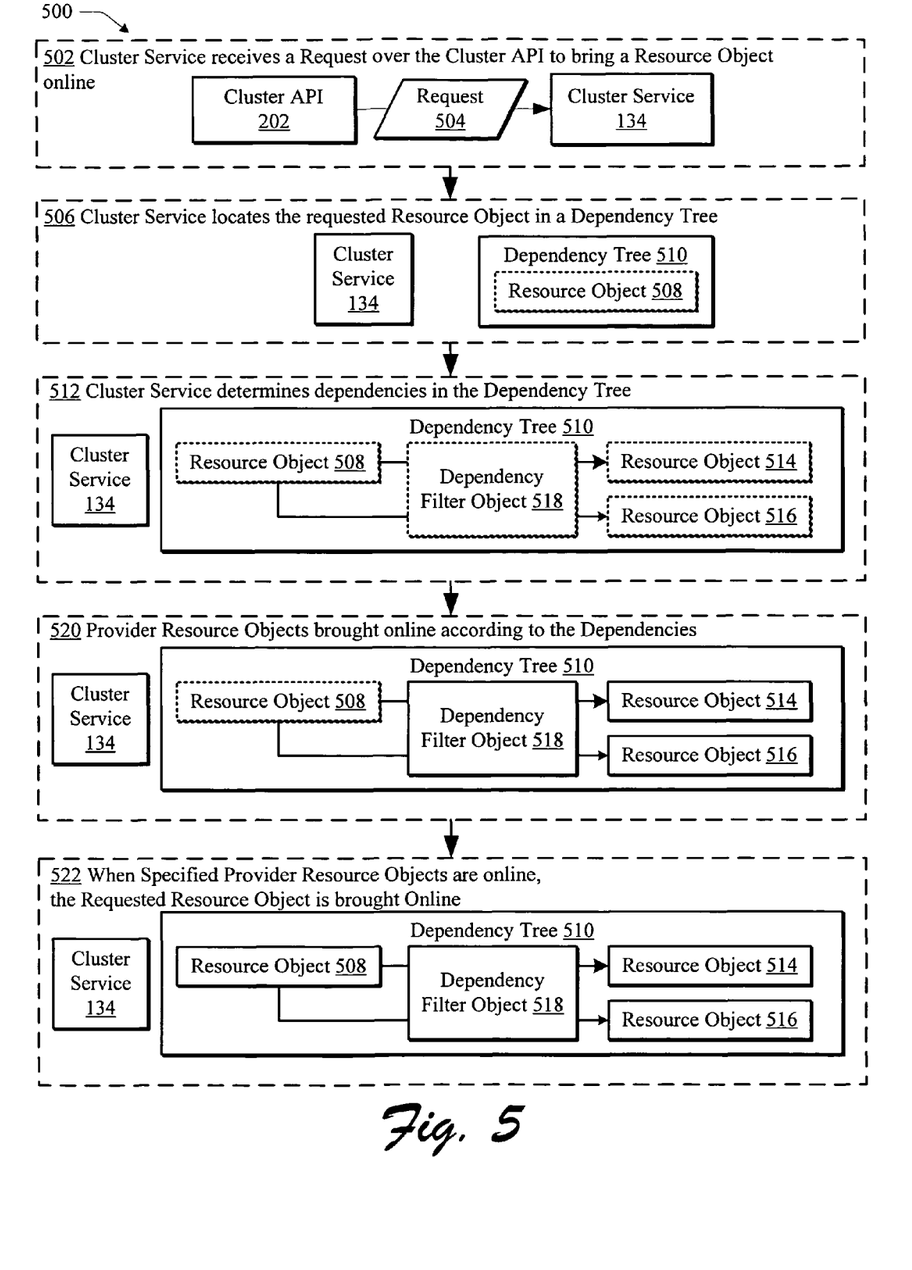
FIG. 5 is a flow chart depicting a procedure in an exemplary implementation in which one or more provider resource objects are brought online in response to a request to bring online a dependent resource object.

FIG. 5 is a flow chart depicting a procedure 500 in an exemplary implementation in which one or more provider resource objects are brought online in response to a request to bring online a dependent resource object. At block 502, the cluster service 134 receives a request over the cluster API 202 to bring online a resource object. For example, the cluster API 202 may receive the request from an administrator using one or more of the cluster management tools 204 of FIG. 2. In another example, the cluster API 202 may receive the request which is formed by an application executed on the same server or a different server over a network.

At block 506, the cluster service 134, when executed, locates the requested resource object 508 in a dependency tree 510. The dependency tree 510 may or may not correspond to the dependency trees 300, 400 illustrated in FIGS. 3 and 4, respectively. The request 504, for instance, may specify a particular resource object be brought online to provide the corresponding resource, such as a software module and/or a hardware device. The cluster service 134 may utilize the specification in the request 504 to find the resource object 508 that corresponds to the request 504. In block 506, the resource object 508 is illustrated in phantom to indicate that although the resource object 508 is found, it is not currently online.

At block 512, the cluster service 134 is executed to determine one or more dependencies of the resource object 508 in the dependency tree 510. For example, the cluster service 134, when executed, may "walk" the dependency tree 510 to locate objects that are related to execution of the resource object 508. The dependency filter object 518, for instance, may follow the "M out of N, P out of N" technique, as previously described in relation to FIG. 3, in which the source object 508 is specified by the dependency filter object 518 as "2 out of 2, 1 out of 2". Therefore, the resource object 508 can be brought online if both resource objects 514, 516 are online.

At block 520, the provider resource objects are brought online according to the dependencies determined at block 512. For example, the cluster service 134 will ask the resource objects 514, 516 to come online, which is illustrated in block 520 through the use of solid borders for both of the resource objects 514, 516.

At block 522, when the specified provider resource objects are online, the requested resource object 508 is brought online. In this instance, once resource objects 514, 516 are brought online at block 520, the resource object 508 is then brought online according to the dependencies specified by the dependency filter object 518. Resource object 508 is illustrated in block 522 as being online through use of a solid border when depicting the resource object 508. Thus, in this implementation, the dependency filter object 518 was utilized to describe an order in which the resource object 508, 514, 516 of the dependency tree should be brought online. The dependency filter object 518 may also be utilized during "runtime" to determine which actions should be performed to manage the resource objects 508, 514, 516, an example of which is described in relation to the following figure.

Figure 6:
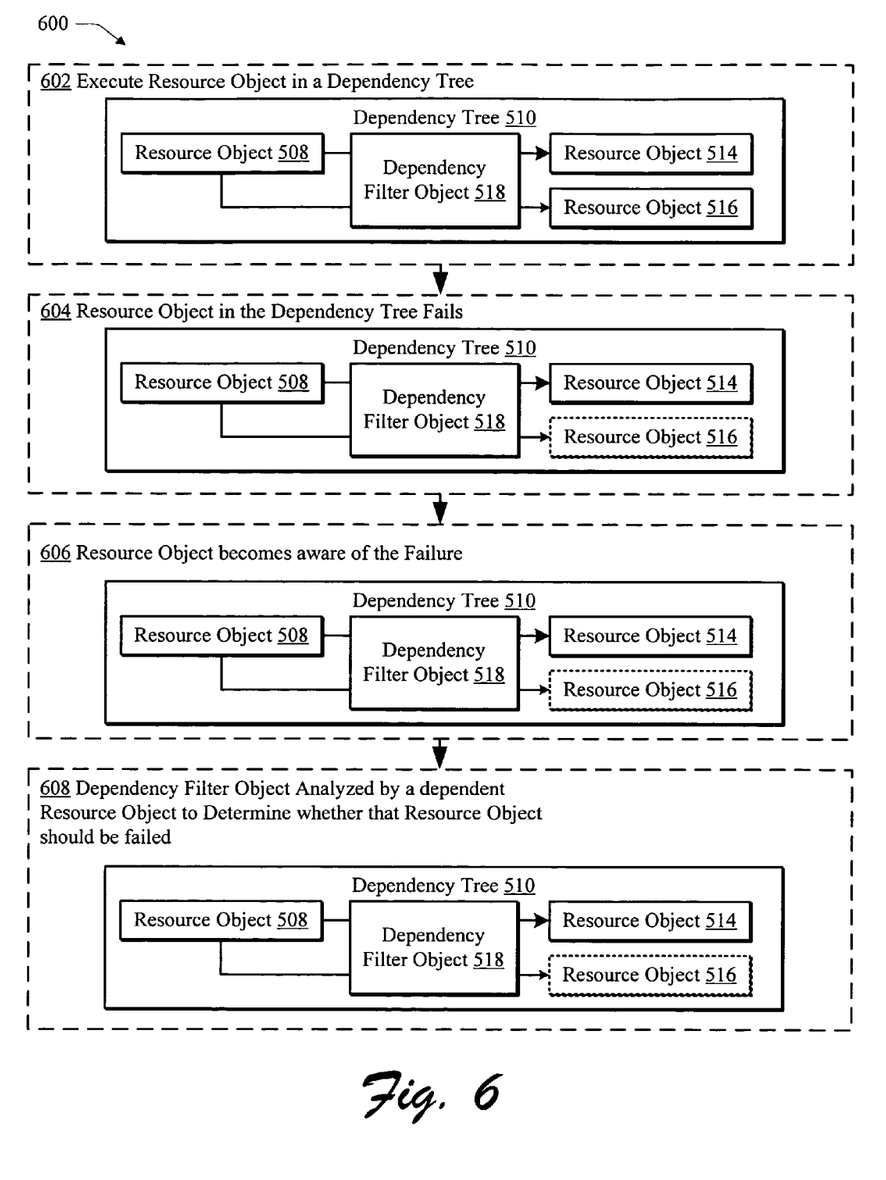
FIG. 6 is a flow chart depicting a procedure in an exemplary implementation in which a dependency filter object of FIG. 5 is utilized by resource objects in the dependency tree to determine which actions, if any, should be performed in response to failure of another resource object in the dependency tree.

FIG. 6 is a flow chart depicting a procedure 600 in an exemplary implementation in which the dependency filter object 518 of FIG. 5 is utilized by resource objects in the dependency tree 510 to determine which actions, if any, should be performed in response to failure of another resource object in the dependency tree 510. At block 602, the resource objects 508, 514, 516 of the dependency tree 510 of FIG. 5 have been brought online. For example, the resource objects 508, 514, 516 may have been brought online to provide Internet content, obtain data from a disk drive, and so forth.

At block 604, a resource object 516 in the dependency tree 510 fails. The resource object 516 is illustrated in phantom in block 604 to indicate that the resource object 516 is no longer available to provide corresponding functionality. At block 606, another resource object of the dependency tree 510 becomes aware of the failure of the resource object 516. For example, the resource object 508 may "time-out" after a pre-determined amount of time elapses during which the resource object 508 has not received data from the resource object 516. In another example, the resource object 508 sends periodic messages to the other resource object 516 to provide a mechanism for detecting that the communications path(s) are operating correctly and that the other resource object 516 is operational.

At block 608, the dependency filter object 518 is analyzed by a dependent resource object to determine if that resource object should declare failure in response to its failure to perform the necessary functions or operations related to resource object 516. The resource object 508, for instance, may utilize the "EvaluateIsAlive" function of the dependency filter object 518 to determine conditions for the dependency of the resource object 508 on the other resource objects 514, 516 of the dependency tree 510. In this instance, the resource object 508 determines if it should fail by invoking the "EvaluateIsAlive" function affiliated with the dependency filter object 518. This allows the policy to be encoded in a dependency filter object and allows the provider resource to query the policy when desired. As previously described, the dependency filter object 518 specifies the dependency of the resource object 508 on the other resource objects 514, 516 using the "M out of N, P out of N" technique in which the resource object 508 is specified by the dependency filter object 518 as "2 out of 2, 1 out of 2". Therefore, the resource object 508 can be brought online if both resource objects 514, 516 are already online. The resource object 508, however, may remain online as long as one of the two resource objects 514, 516 remains online. In this instance, the resource object 508 remains online even though the resource object 516 failed. It should be noted that in this instance the resource object 508 itself determines conditions for continued execution through use of the dependency filter object 518. In the previous implementation that was described in relation to FIG. 5, the cluster service 134 utilized the dependency filter object 518 to determine when resource 508 may be brought online. The cluster service 134 may also utilize the dependency filter object 518 to determine whether bring the resource objects 508, 514, 516 offline, an example of which is discussed in relation to the following figure.

Figure 7:
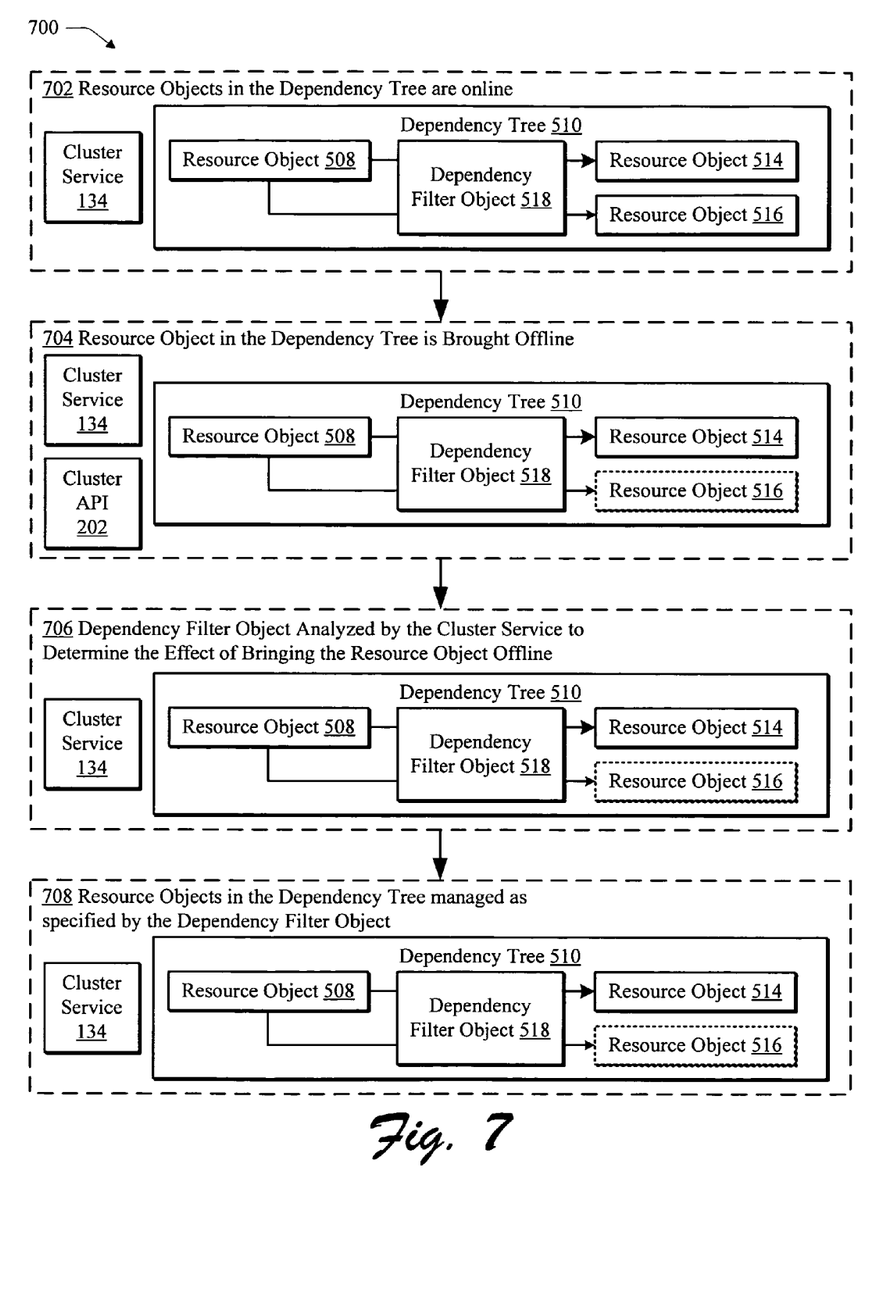
FIG. 7 is a flow chart depicting a procedure in an exemplary implementation in which the dependency filter object of FIG. 5 is utilized by the cluster service to determine if a resource object should be taken offline in response to another resource object being taken offline

FIG. 7 is a flow chart depicting a procedure in an exemplary implementation in which the dependency filter object of FIG. 5 is utilized by the cluster service to determine if a resource object should be taken offline in response to another resource object being taken offline. At block 702, the resource objects 508, 514, 516 in the dependency tree 510 are online. At block 704, resource object 516 is brought offline, which is shown by depicting the resource object 516 in phantom. The cluster service 134, for instance, may receive a request over the cluster API 202 to bring the resource object 516 offline, such as through use of the cluster administration tools 204 of FIG. 2 by an administrator, and so on.

At block 706, the dependency filter object 518 is analyzed by the cluster service 134 to determine the effect of bringing the resource object 516 offline on other resource objects of the dependency tree 510. The cluster service 134, for instance, analyzes the dependency filter object 518 affiliated with a provider resource object, e.g. resource object 516, when it transitions to an offline state. By invoking the "EvaluateUpstreamOffline" function affiliated with the dependency filter object 518, the cluster service 134 determines which "upstream" resource objects, if any, should also be brought offline. In the case of termination, the "EvaluateUpstreamTerminate" function may be utilized as previously described. Continuing with the previous example, the dependency filter object 518 specifies that the resource object 508 may remain online if either resource object 514 or resource object 516 is online. Therefore, at block 708, the other resource objects 508, 514 are managed by the cluster service 134 as specified by the dependency filter object 518, which in this instance specifies that resource object 508 remains online. Thus, when the specified dependency of the dependency filter object 518 is met, the resource object 508 remains, otherwise the resource object 508 is taken offline.

Exemplary Operating Environment

Figure 8:
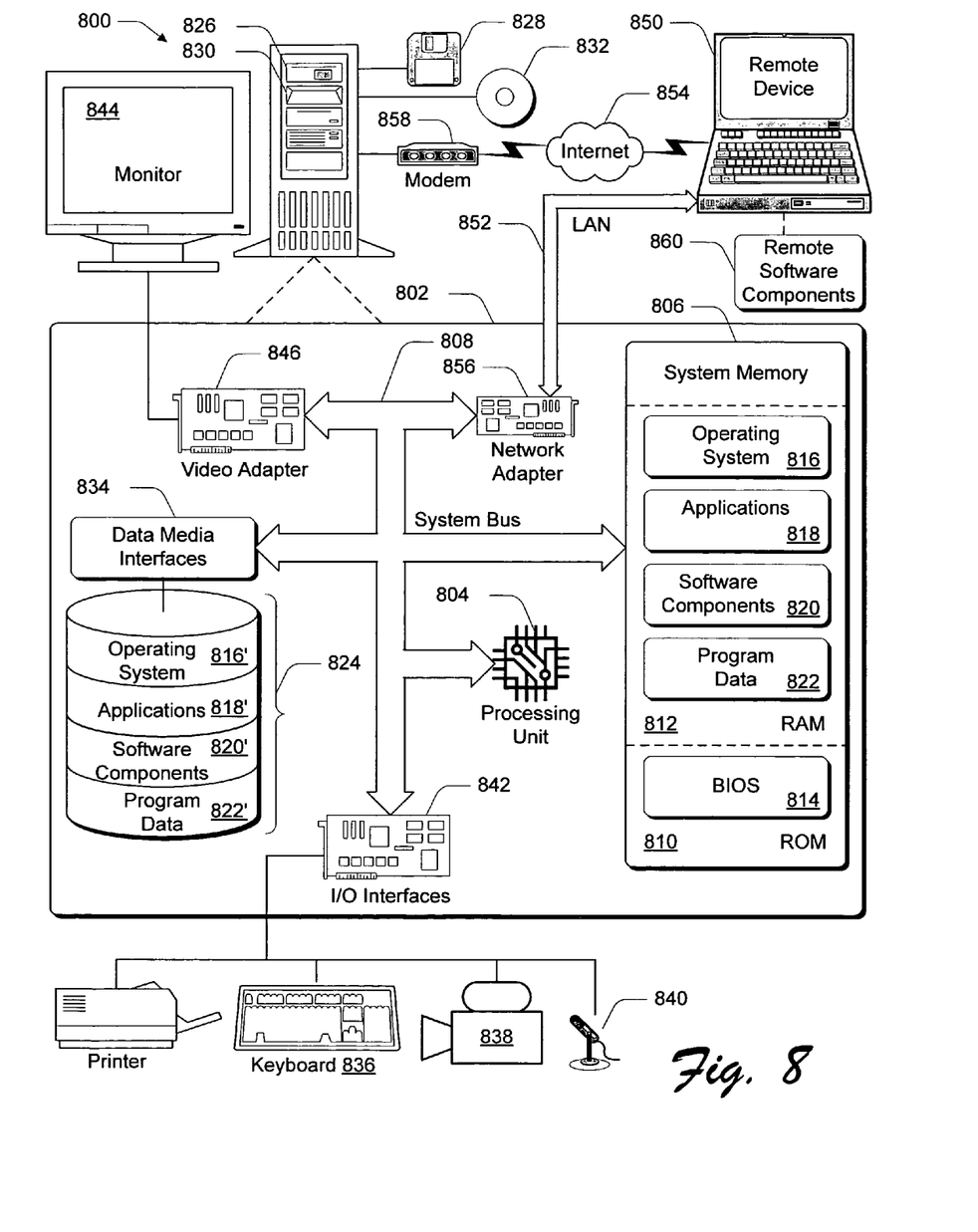
FIG. 8 is an illustration of an exemplary operating environment.

The various components and functionality described herein are implemented with a number of individual computers. FIG. 8 shows components of a typical example of a computer environment 800, including a computer, referred by to reference numeral 802. The computer 802 may be the same as or different from the plurality of servers 104(1)-104(N) of FIG. 1. The components shown in FIG. 8 are only examples, and are not intended to suggest any limitation as to the scope of the functionality of the invention; the invention is not necessarily dependent on the features shown in FIG. 8.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, and so on, that perform particular tasks or implement particular abstract data types. Tasks might also be performed by remote processing devices that are linked through a communications network. In a distributed computing environment, software components may be located in both local and remote computer storage media as previously described in relation to FIG. 1.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 802 may include, but are not limited to, a processing unit 804, a system memory 806, and a system bus 808 that couples various system components including the system memory to the processing unit 804. The system bus 808 may be any of several types of bus structures including a memory bus or memory controller, a peripheral bus, and a local bus using any of a variety of bus architectures.

Computer 802 typically includes a variety of computer-readable media. Computer-readable media can be any available media that can be accessed by computer 802 and includes both volatile and nonvolatile media, removable and non-removable media. By way of example, and not limitation, computer-readable media may comprise computer storage media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video discs (DVD) or other optical disk storage, magnetic cassettes, magnetic tape, magnetic disk storage or other magnetic storage devices, or any other medium which can be used to store the desired information and which can be accessed by computer 802. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media.

The system memory 806 includes computer storage media in the form of volatile and/or nonvolatile memory such as read only memory (ROM) 810 and random access memory (RAM) 812. A basic input/output system 814 (BIOS), containing the basic routines that help to transfer information between elements within computer 802, such as during startup, is typically stored in ROM 810. RAM 812 typically contains data and/or software components that are immediately accessible to and/or presently being operated on by processing unit 804. By way of example, and not limitation, FIG. 8 illustrates operating system 816, applications 818, software components 820, and program data 822. The applications 818, for instance, may be configured as the resource group 302 having the plurality of resource objects shown in FIG. 3.

The computer 802 may also include other removable/non-removable, volatile/nonvolatile computer storage media. By way of example only, FIG. 8 illustrates a hard disk drive 824 that reads from or writes to non-removable, nonvolatile magnetic media, a magnetic disk drive 826 that reads from or writes to a removable, nonvolatile magnetic disk 828, and an optical disk drive 830 that reads from or writes to a removable, nonvolatile optical disk 832 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 824 is typically connected to the system bus 808 through a non-removable memory interface such as data media interface 834, and magnetic disk drive 826 and optical disk drive 830 are typically connected to the system bus 808 by a removable memory interface.

The drives and their associated computer storage media discussed above and illustrated in FIG. 8 provide storage of computer-readable instructions, data structures, software components, and other data for computer 802. In FIG. 8, for example, hard disk drive 824 is illustrated as storing operating system 816', applications 818', software components 820', and program data 822'. Note that these components can either be the same as or different from operating system 816, applications 818, software components 820, and program data 822. Operating system 816', applications 818', software components 820', and program data 822' are given different numbers here to illustrate that, at a minimum, they are different copies. A user may enter commands and information into the computer 802 through input devices such as a keyboard 836, and pointing device (not shown), commonly referred to as a mouse, trackball, or touch pad. Other input devices may include source devices (such as a microphone 838 or camera 840 which provide streaming data), joystick, game pad, satellite dish, scanner, or the like. These and other input devices are often connected to the processing unit 802 through an input/output (I/O) interface 842 that is coupled to the system bus, but may be connected by other interface and bus structures, such as a parallel port, game port, or a universal serial bus (USB). A monitor 844 or other type of display device is also connected to the system bus 808 via an interface, such as a video adapter 846. In addition to the monitor 844, computers may also include other rendering devices (e.g., speakers) and one or more printers, which may be connected through the I/O interface 842.

The computer may operate in a networked environment using logical connections to one or more remote computers, such as a remote device 850. The remote device 850 may be the same as or different from the remote client 102 of FIG. 1. The remote device 850 may be a personal computer, a network-ready device, a server, a router, a network PC, a peer device or other common network node, and typically includes many or all of the elements described above relative to computer 802. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 802 is connected to the LAN 852 through a network interface or adapter 856. When used in a WAN networking environment, the computer 802 typically includes a modem 858 or other means for establishing communications over the Internet 854. The modem 858, which may be internal or external, may be connected to the system bus 808 via the I/O interface 842, or other appropriate mechanism. In a networked environment, program modules depicted relative to the computer 802, or portions thereof, may be stored in the remote device 850. By way of example, and not limitation, FIG. 8 illustrates remote software components 860 as residing on remote device 850. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving, by one or more computing devices, a request to bring a first resource object of a plurality of resource objects online, each resource object corresponding to a resource on a server in a server cluster;
analyzing, by the one or more computing devices, a dependency filter object, the dependency filter object being an expression specifying dependencies of the first resource object on at least three other resource objects of the plurality of resource objects, two of the three other resource objects being specified as alternatives of each other; and
processing, by the one or more computing devices, the request to bring the first resource object online in accordance with the analysis of the dependency filter object.

2. The method of claim 1, wherein the two of the three other resource objects that are specified as alternatives of each other are redundant such that the first resource object is configured to remain online or be brought online when either of the two of the three other resource objects is online.

3. The method of claim 1, wherein the expression is a Boolean expression.

4. The method of claim 1, wherein the dependency filter object includes at least:
one or more resource objects that are brought online before the first resource object is brought online; or
one or more resource objects that are online during execution of the first resource object.

5. The method of claim 1, wherein the processing comprises, when the dependencies of the first resource object specified in the dependency filter object are met, bringing the first resource object and the other resource objects on which it depends online in an order derived from the dependency filter object.

6. The method of claim 1, wherein the processing comprises, when the dependencies of the first resource object specified in the dependency filter object are not met, refraining from bringing the first resource object online.

7. The method of claim 1, further comprising:
determining that a resource object on which the first resource object depends has failed;
determining whether a duplicate resource object of the failed resource object is online; and
when the duplicate resource object is not online, bringing the first resource object offline.

8. The method of claim 1, wherein the plurality of resource objects are arranged as a resource group that forms at least a portion of an application.

9. The method of claim 1, wherein the plurality of resource objects are arranged as a dependency tree.

10. The method of claim 1, wherein the dependency filter object is configured to expose a function for determining whether to bring any of the three other resource objects online before bringing the first resource object online.

11. The method of claim 1, wherein the dependency filter object is configured to expose a function for determining whether to bring the first resource object offline when one or more of the three other resource objects is brought offline.

12. One or more computer storage devices media comprising executable instructions stored thereon that are configured to program one or more computing devices to perform operations including:
receiving a request to bring a provider resource object of a plurality of resource objects offline, each resource object corresponding to a resource on a server in a server cluster;
analyzing one or more dependency filter objects associated with the provider resource object, at least one of the dependency filter objects including an expression specifying dependencies of a dependent resource object of the plurality of resource objects on the provider resource object and on at least two other provider resource objects of the plurality of resource objects, the two other provider resource objects being specified as alternatives of each other; and
processing the request to bring the provider resource object and the dependent resource object offline in accordance with the analysis of the one or more dependency filter objects.

13. The one or more computer storage media of claim 12, wherein the two other provider resource objects that are specified as alternatives of each other are redundant such that the dependent resource object is configured to remain online or be brought online when either of the two other provider resource objects and the provider resource object are online.

14. The one or more computer storage media of claim 12, wherein the expression is a Boolean expression.

15. The one or more computer storage media of claim 12, wherein the at least one of the dependency filter objects specifies at least:
one or more resource objects that are brought online before the dependent resource object is brought online; or
one or more resource objects that are online during the execution of the dependent resource object.

16. The one or more computer storage devices media of claim 12, wherein the operations further include bringing the dependent resource object and the provider resource objects on which it depends online in an order derived from the dependency filter object when the dependencies of the dependent resource object specified in the dependency filter object are met.

17. The one or more computer storage media of claim 12, wherein the plurality of resource objects are arranged as a resource group that forms at least a portion of an application.

18. The one or more computer storage devices media of claim 12, wherein the plurality of resource objects are arranged as a dependency tree.

19. The one or more computer storage devices media of claim 12, wherein the dependency filter object is configured to expose a function for determining whether to bring the provider resource objects online before bringing the dependent resource object online.

20. The one or more computer storage devices media of claim 12, wherein the dependency filter object is configured to expose a function for determining whether to bring the dependent resource object offline when one of the provider resource objects is brought offline.

21. A system comprising:
a memory;
a plurality of resource objects stored in the memory, each resource object corresponding to a resource on a server in a server cluster; and
a dependency filter object stored in the memory, that specifies a dependency in an execution, on the server, of a first resource object on second and third resource objects, the second and third resource objects being specified as alternatives to each other such that the first resource object is configured to remain online or be brought online when either the second or third resource objects is online.

22. The system of claim 21, further comprising a cluster service to analyze the dependency filter object when the second resource object fails and the first resource object is online, the analyzing including determining whether an action is to be performed regarding the first resource object such that if the third resource object is online, the first resource object remains online, and otherwise the first resource object is brought offline.

* * * * *